United States Patent [19]

Van de Voorde et al.

[11] Patent Number: 5,808,766
[45] Date of Patent: Sep. 15, 1998

[54] METHOD FOR MEASURING A SIGNAL TRANSMISSION DELAY TIME, CENTRAL STATION, TERMINAL STATION AND NETWORK TO PERFORM THIS METHOD

[75] Inventors: Ingrid Zulma Benoit Van de Voorde, Wilrijk; Jan Lieven Bert De Groote, Berchem; Gert Van der Plas, Merchtem, all of Belgium

[73] Assignee: Alcatel N.V., BH Rijswijk, Netherlands

[21] Appl. No.: 718,278

[22] Filed: Sep. 20, 1996

[30] Foreign Application Priority Data

Sep. 22, 1995 [EP] European Pat. Off. .............. 95202555

[51] Int. Cl.⁶ ...................................................... H04J 14/08
[52] U.S. Cl. ............................................. 359/140; 370/508
[58] Field of Search ...................................... 359/140, 136, 359/137, 118; 370/508, 519, 443, 442

[56] References Cited

U.S. PATENT DOCUMENTS

| | | | |
|---|---|---|---|
| 5,299,044 | 3/1994 | Mosch et al. ............................ | 359/161 |
| 5,327,277 | 7/1994 | Van Der Plas et al. ................. | 359/140 |
| 5,341,365 | 8/1994 | Clarke ..................................... | 370/508 |
| 5,559,805 | 9/1996 | Hedderly ................................. | 370/443 |
| 5,642,355 | 6/1997 | Smith ...................................... | 370/442 |

*Primary Examiner*—Leslie Pascal
*Attorney, Agent, or Firm*—Ware, Fressola, Van Der Sluys & Adolphson LLP; Milton Oliver

[57] ABSTRACT

The method is used in an optical transmission network with a plurality of terminal stations (TS1–TSn) connected to a central station (CS) via a tree-like connection structure, to determine a signal transmission delay time between one terminal station (TSi) and the central station. The terminal stations are adapted to send cells containing information signals to the central station in dedicated time slots. The method consists of sending a start signal (start CR) from the central station to the terminal station (TSi), after a first predetermined time interval after the receipt of that start signal sending a ranging signal from the terminal station to the central station, after a second predetermined time interval after the sending of the start signal sending an inhibit signal from the central station to the terminal stations to indicate that no cells may be transmitted during an idle time window; determining in the central station the signal transmission delay time from the contents of the predetermined ranging signal received by the central station during the idle time window. The ranging signal either has an amplitude which is smaller than the information signals contained in the cells in order not to disturb the information signals when the ranging signal is transmitted outside the idle time window, or has a similar amplitude, in which case error codes are included in the cells in order to recover possible disrupted cells.

18 Claims, 4 Drawing Sheets

METHOD FOR MEASURING A SIGNAL TRANSMISSION DELAY TIME, CENTRAL STATION, TERMINAL STATION AND NETWORK TO PERFORM THIS METHOD

TECHNICAL FIELD

The present invention relates to a method for measuring in an optical transmission network with a plurality of terminal stations connected to a central station via a tree-like connection structure, a signal transmission delay time between one terminal station of the plurality of terminal stations and the central station, wherein the terminal stations are adapted to send cells containing information signals to the central station in dedicated time slots.

This invention also relates to a central station, a terminal station and an optical network performing this method.

BACKGROUND OF THE INVENTION

Such a method, central station, terminal station and network are already known in the art, e.g. from the European Patent Application 90890273.7. (U.S. Pat. No. 5,107,361) Therein an optical system is described where a terminal station after becoming active can perform its ranging procedure, i.e. a procedure to determine the transmission delay between that terminal station and the central station, and additionally the procedure for obtaining its address, in a so called ranging window wherein the other terminal stations already active do not send cells to the central station. From this transmission delay the terminal station then determines in which time slot it is enabled, after receipt of a grant signal from the central station to send its information cells. This known procedure implies that the ranging window equals at least twice the maximum transmission delay of the network since the terminal station which becomes active is not aware of the configuration of the network, i.e. it is not aware of the distance between the other terminal stations and the central station and consequently it does not know when it may send a ranging signal without disturbing the transmission of the information signals. As a result, the active terminals are not allowed to send information during a relatively long period, especially since this ranging procedure is executed periodically, either to allow activated terminals to go through a configuration phase, or to possibly adjust the already defined transmission delays of already active terminals.

SUMMARY OF THE INVENTION

An object of the invention is to provide a method, a terminal station, a central station and a network realizing this method, such as the known one but which does not have the above drawback, i.e. where there is no need for a relatively large ranging window.

Indeed, by either sending a ranging signal with an amplitude lower than the amplitude of the information signals or including error codes in the cells and sending a ranging signal with an amplitude near to the amplitude of the information signals, the ranging signal can be transmitted during the transmission of the information signals, i.e. outside the idle time window, called ranging window in the known method. The central station can thus open a ranging window, by asking the terminal stations to stop transmission of the information signals, during a time interval which is smaller than in the known systems, provided that that the window and the ranging signal are so chosen that at least part of the latter signal can be received during the open window, i.e. the period of transmission of the ranging signal has at least partly to overlap the idle time window. Different choices can be made with respect to the length of the idle time window, the length of the predetermined time intervals and of the type of ranging signal. The definite choice is a trade off between the time and the bandwidth needed for performing the ranging procedure. Indeed, the larger the window, the more bandwidth is required, but the more information can be received by the central station and thus the less time is required to determine the transmission delay with a required accurracy and vice versa. A possible choice realizing a good compromise between the latter time and bandwidth requirements is to initially set the length L of the ranging signal to twice the maximum possible difference in respective delays between the central station and respective terminal stations, and thereafter to adjust the length, based on actual delay measurements.

It should be noted that the use of error codes and of ranging signals having an amplitude in the range of the amplitude of the information signals is especially suited for large scale passive optical networks also called SUPER-PONs with a relatively high number of terminal stations and relatively large distances between the terminal stations and the central station and having a high dynamic range, and wherein due to the amplifiers, used the amplitude of the noice signals come within the range of the amplitude of a reduced amplitude ranging signal.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
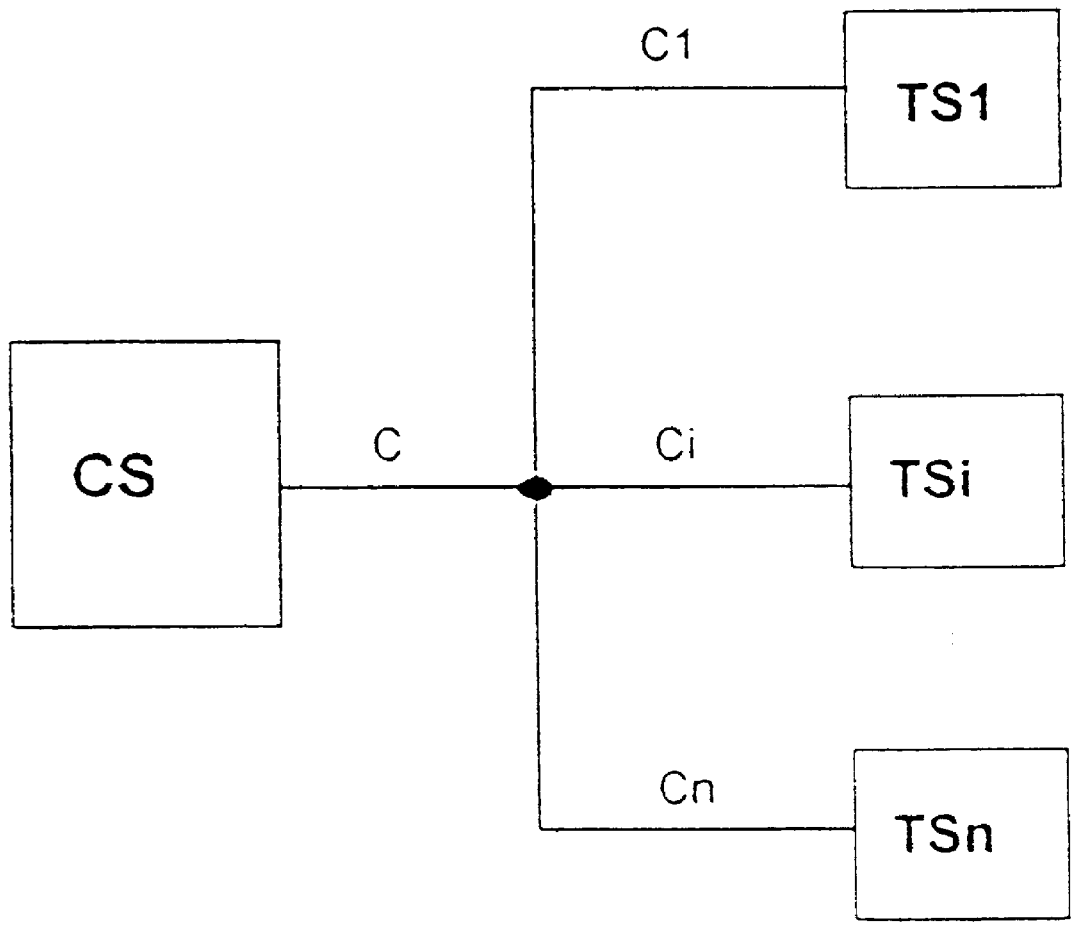
FIG. 1 represents an optical network wherein a method according to the invention is realized.

The network of FIG. 1 is a passive optical network or PON network over which Time Division Multiple Access or TDMA PON cells are transmitted. These cells (not shown) consist of a header, containing a synchronization preamble, and a data packet.

Figure 2:
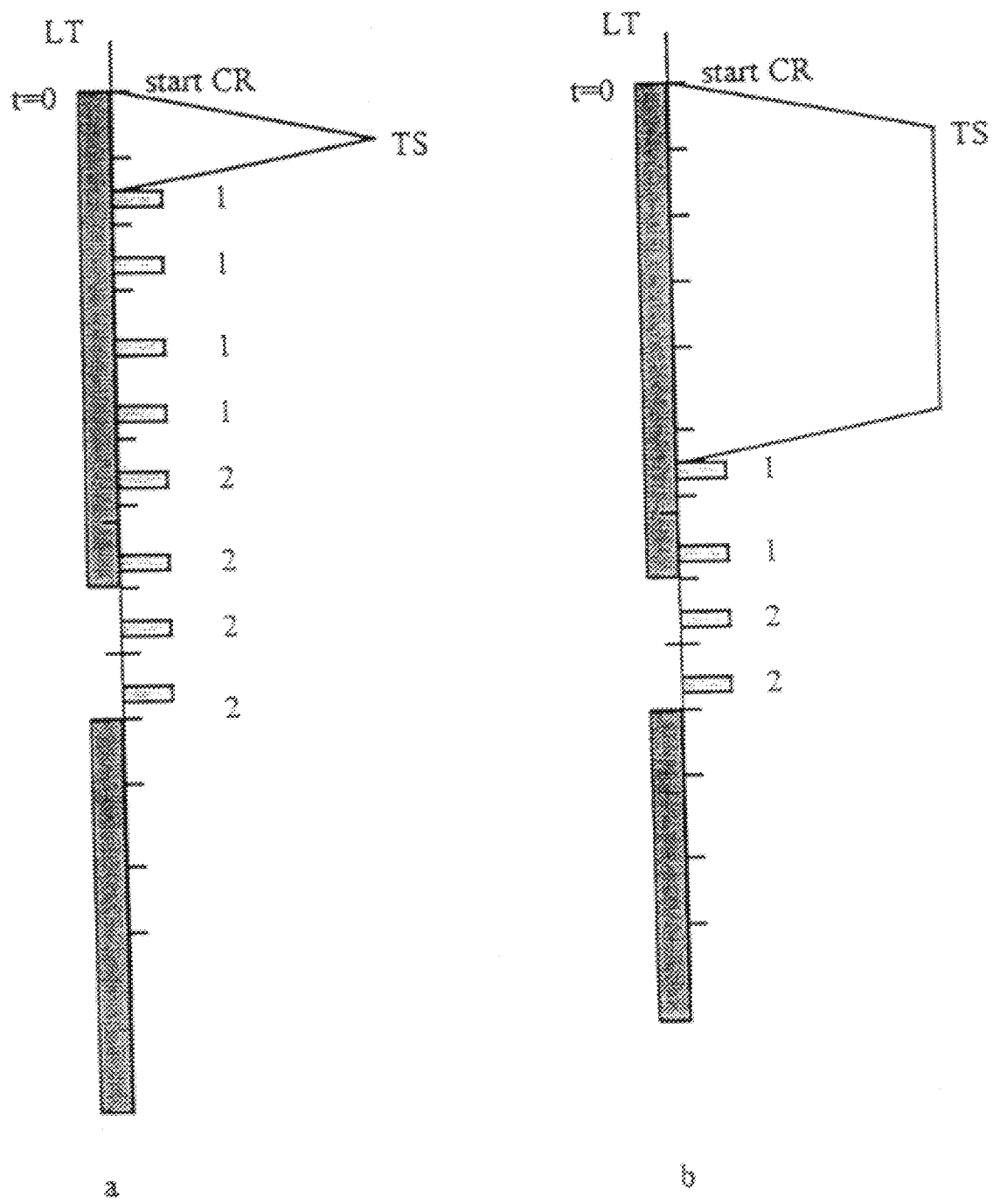
FIGS. 2a and 2b are timing diagrams of the performance of a ranging method according to the invention.
Figure 3:
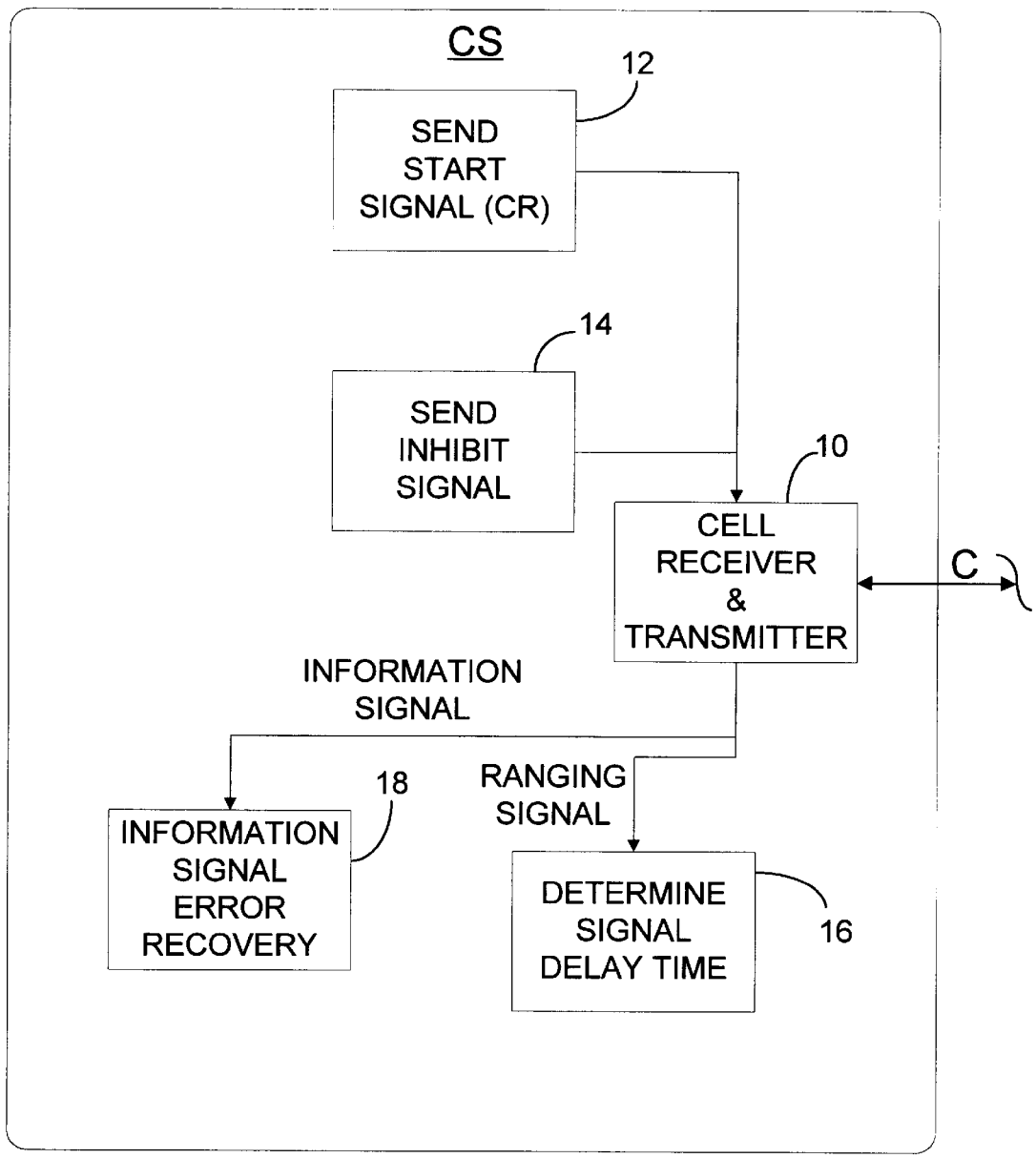
FIG. 3 is a functional block diagram of the central station shown in FIG. 1.

The network includes a central station CS coupled to a plurality of terminal stations TS1 to TSn via a common fiber link C and dedicated links C1 to Cn. PON cells are transmitted over the network in downwards direction from CS to the terminal stations and in upwards direction from the terminal stations to CS in dedicated time slots. To avoid collision between the upwards sent cells, each terminal station has to be aware of its transmission delay, i.e. of the distance between itself and the central station. Transmission of upstream cells is initiated by the central station by a grant signal. Upon receipt of such a grant signal a terminal station has to take into account a predetermined delay, called ranging delay, before sending a cell to avoid the above mentioned collision. This delay is such that it is as if the terminal station was located at the maximum network distance from the central station and can be deduced from the earlier mentioned transmission delay. The procedure for determining the transmission delay or the ranging delay, also called the ranging procedure, as used in the subject invention is described hereafter with reference to FIGS. 1 and 2. As best seen in FIG. 3, the central station includes a cell receiver and transmitter 10 connected to the common fiber link C. The central station further includes means to send a start signal (CR) 12 and means to send an inhibit signal 14 whose operation is explained below. In addition, the central station includes means to determine the signal delay time 16 from a terminal station based upon receipt of a ranging signal from that terminal station. An information signal recovery module 18 is used to interpret error codes included with cells containing information signals that are generated by terminal stations so as to recover information signals when these signals are corrupted due to transmission of a ranging signal at least outside the idle time window for a portion of the ranging signal's duration.

Figure 4:
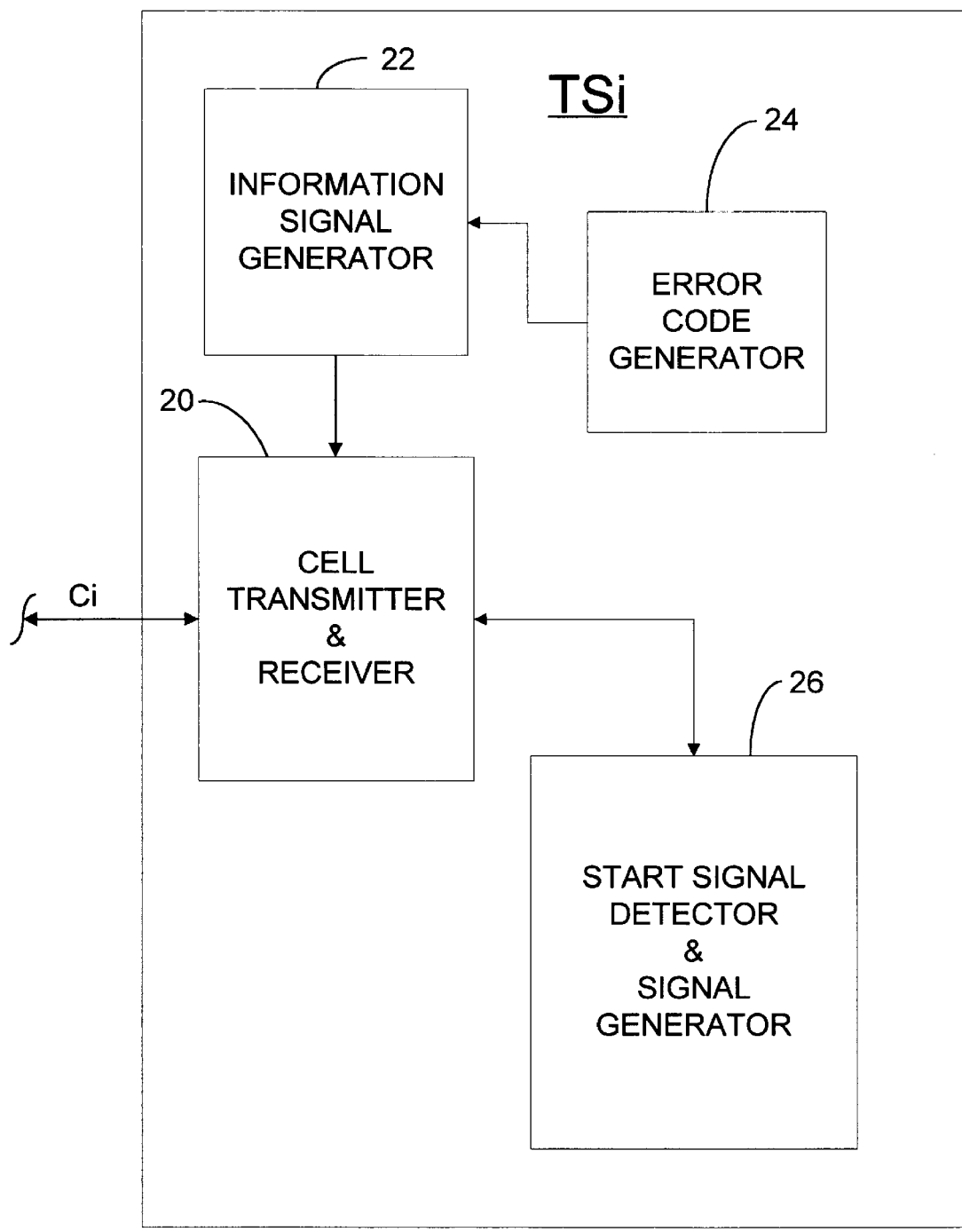
FIG. 4 is a functional block diagram of one of the terminal stations shown in FIG. 1.

Each terminal station includes a number of functional modules as best seen in FIG. 4. Thus a cell transmitter and receiver 20 connects to fiber link Ci associated with the specific terminal station, where i=1,2, ..., n. An information signal generator 22 generates cells containing desired information. An error code generator 24 can interface with the information signal generator to add error codes to the cells so as to facilitate recovery of information signal by the central station when the information signal is corrupted by transmission of a ranging signal outside the idle time window for a portion of its duration. Each terminal station further includes a start signal (CR) detector and ranging signal generator 26. The operation of these functional modules is explained in more detail below.

The principle of the ranging procedure is that a terminal station after becoming active, e.g. TSi, sends upon receipt of a start ranging signal called start CR, a ranging signal towards CS. Depending on the type of the network, this signal is either sent out at an amplitude relatively smaller than that of the information signals included in the PON upstream cells or at an amplitude in the range thereof. In relatively small networks, where there is no need for optical amplifiers, the ranging signal is sent out at the relatively lower amplitude, which is such that there is no degradation of the information signals. However in larger networks including optical amplifiers, the resulting noise signal can have an amplitude in the range of the lower amplitude ranging signal, and therefore, the ranging signal is then generated at an amplitude in the range of the PON cell signals. In order to be able to recover the latter signals in case of possible degradation due to the transmission of the ranging signal, Forward Error Correction coding such as the Reed Solomon coding, is included in the cells. Use of such error codes in transmission systems is well known in the art and is therefore not described in details.

A predetermined period after the sending of the start CR signal, CS sends a inhibit signal to the other terminal stations to stop sending cells during a well defined time interval, also called ranging window, which is smaller than the time interval during which the ranging signal is transmitted by TSi. Upon receipt of the ranging signal during the ranging window, CS determines based on the contents of the signal, a first evaluation of the transmission delay of TSi, as will be described hereafter, and transmits the thus obtained evaluation of the transmission delay to TSi. The ranging procedure is possibly repeated a predetermined number of times to more accurately evaluate this transmission delay. However, during those repetitions, the ranging signal is not sent out upon receipt of the start CR signal but a predetermined time interval thereafter. This time interval equals a ranging delay deduced from the previously evaluated transmission delay. As will be explained hereafter, the ranging signal, which consists of a number of repeated sequence numbers contained in this signal, is adapted accordingly. The complete procedure is additionally repeated on a periodic basis while TSi is active, to possibly adjust the determined transmission delay. In order to clarify how the value of the parameters used in the ranging procedure such as the time interval between the sending of the start CR and the signal to inhibit the sending of cells and the type of ranging signal are chosen, a description is given hereafter of a ranging procedure applied to a specific example to which FIG. 2 is applicable.

A network of maximum length of 4 cells is considered.

As already mentioned earlier, the ranging signal consists of subsequently sent ranging messages. These messages are sent with a cell frequency and include subsequent sequence numbers. For a network with a maximum length of 4 cells and choosing a maximum sequence number of 2, the ranging window has at least to be opened during the 8th cell after the transmission of the start CR signal to take into account a possible location of a terminal station performing the ranging procedure at the maximum distance from the central station. However, in order to see at the central station possible sequence transitions, a window of 2 cells, i.e. the 8th and the 9th cell after the start CR, is opened. As a result, the ranging signal has to consist initially in a first execution of the steps of the method of 8 ranging messages, 4 with sequence number 1 and 4 with sequence number 2, to take into account a possible location of the terminal station at a minimum distance from the central station. In this example the ranging procedure is performed by a terminal station TS located within the first cell from the central station. This means, as can be seen in FIG. 2a, that the terminal station receives the start CR after an interval smaller than 1 cell and that the ranging signal, or more specifically the first message thereof is received by the central station between 1 and 2 cells after the latter starts the CR signal. As a result, the central station sees in the ranging window 2 times a sequence number 2, from which it can be deduced that the terminal station is located in the first half of the network, i.e. between 0 and 2 cells away from that central station.

This is communicated to the terminal station, which in a second step, i.e. after receipt of a second start CR signal, supposes it is located 2 cells away from the central station and waits for its first evaluated ranging delay of 2×(4−2)=4 cells before transmitting the ranging signal. This ranging signal then consists of the sending of 4 ranging messages, 2 with sequence number 1 and 2 with sequence number 2. The open window again includes the 8th and 9th cell after the start CR and as a result, the central station again sees 2 times the sequence number 2 as can be seen in FIG. 2b, meaning that the terminal station is located within the first half of the first half of the network, i.e. within 1 cell from the central station. In this way, the transmission delay of the station is determined with an accuracy of 1 cell.

It should be noted that had the terminal station been located in the second part of the network, then it would have supposed to be located 4 cells away from the central station and it would, in a second step of the ranging, have sent out a ranging signal immediately after the receipt of the start CR.

Generalizing the above description, the parameters for the subject ranging method can be defined as follows.

Assuming that L is the number of upstream cells corresponding to twice the maximum difference in transmission delay between two terminal stations, i.e. twice the maximal distance between the central station and a terminal station, and 2" being the maximum sequence number, then a terminal station has to send after the first start CR:

m times the sequence number 1;

. . . ;

m times the sequence number 2" where m=L/2".

The central station opens a ranging window of 2 cells during the Lth and the L+1th cell. The sequence number read in this window gives the transmission delay with an accuracy of L/2", As such, the measurement must be repeated L/2" times, with m being in the subsequent steps divided by 2, in order to determine the transmission delay with a cell accuracy.

It should be noted that the maximum sequence number can be chosen in different ways. The higher this maximum number the more accurately the ranging delay can be determined, but the longer the ranging signal becomes since then more bits are needed to specify the sequence numbers.

In an alternative method, instead of waiting for a time interval equal to a coarse ranging delay, when the latter is known, the ranging signal can in the repetitions of the steps as described above be sent out immediately after the receipt of the start CR, and the central station can rely upon the fact that no ranging message is received in at least part of the ranging window to more accurately determine the transmission delay.

It should also be noted that in order to be able to perform the above described ranging method, the terminal station as well as the central station have to be aware of the value of L and of the chosen maximum sequence number, which have thus to be preconfigured in these latter stations.

Since it will be apparent for a person skilled in the art how to implement a central station and a terminal station based on the above functional description of the steps to be performed to realize the subject ranging procedure, and based of the already known implementations of central stations and terminal stations, these stations are not described herein in further detail.

While the principles of the invention have been described above in connection with specific apparatus, it is to be clearly understood that this description is made only by way of example and not as a limitation on the scope of the invention.

We claim:

1. An optical network with a plurality of terminal stations TS1–TSn connected to a central station (CS) via a tree-like connection structure, and wherein said terminal stations are adapted to send cells containing information signals to said central station in dedicated time slots, said central station including means to receive a predetermined ranging signal from one terminal station (TSi) of said plurality of terminal stations in an idle time window during which no said cells are transmitted, said ranging signal initially having a length or duration equal to two times a maximum possible difference, among respective terminal stations, in respective transmission delays between each terminal station and said central station, and said terminal stations each including means to send said predetermined ranging signal, characterized in that said central station additionally includes:

means to send a start signal (start CR) from said central station to said terminal stations;

means to send, after a first predetermined time interval after the sending of said start signal, an inhibit signal from said central station to said terminal stations, to indicate to said terminal stations that no said cells are to be transmitted during said idle time window;

error recovery means to interpret error codes included in said cells by said terminal stations and to recover said information signals in case of corruption of said information signals due to the transmission of said predetermined ranging signal outside said idle time window;

means to determine a signal transmission delay time, between said one terminal station and said central station, from the contents of said ranging signal received by said central station from said one terminal station during said idle time window; and wherein said terminal stations each additionally include;

means to receive said start signal from said central station sent to said terminal stations and to send out said predetermined ranging signal, a second predetermined time interval after the receipt of said start signal, said predetermined ranging signal having an amplitude relatively near to amplitude of said information signals; and means to include said error codes in said cells.

2. A method for measuring, in an optical transmission network with a plurality of terminal stations (TS1–TSn) connected to a central station (CS) via a tree-like connection structure, a signal transmission delay time between one terminal station (TSi) of said plurality of terminal stations and said central station, said terminal stations being adapted to send cells containing information signals to said central station in dedicated time slots, said method including the step of sending a predetermined ranging signal from said one terminal station to said central station for receipt in an idle time window during which no said cells are transmitted, characterized in that said terminal stations include error codes in at least some of said cells and that said method additionally includes the steps of:

sending a start signal (start CR) from said central station to said one terminal station (TSi);

after a first time interval after the receipt of said start signal, sending said predetermined ranging signal from said one terminal station to said central station, said predetermined ranging signal having an amplitude relatively near to the amplitude of said information signals;

after a second predetermined time interval after sending said start signal, sending an inhibit signal from said central station to said terminal stations to indicate to said terminal stations that no said cells are to be transmitted during said idle time window;

determining, in said central station, said signal transmission delay time from the contents of said predetermined ranging signal received by said central station during said idle time window, said error codes and said predetermined ranging signal being chosen so as to enable recovery of said information signals in case of corruption by said predetermined ranging signal if sent outside said idle time window; and wherein, in a first application of said steps, where said first predetermined time interval equals zero, the length of said predetermined ranging signal equals L, where L equals two times the maximum possible difference, among respective terminal stations, in respective transmission delays between each terminal station and said central station.

3. A method according to claim 2, characterized in that said first predetermined time interval equals a previously determined coarse value of said signal transmission delay time, said steps then being performed to obtain a more accurate value thereof.

4. A method according to claim 2, characterized in that said first predetermined time interval equals zero.

5. A method according to claim 2, characterized in that said predetermined ranging signal is composed of repetitive signals including successive integer values.

6. A method according to claim 5, characterized in that said predetermined ranging signal is composed of repetitive signals including successive integer values, ranging from an initial value to a maximum value which is a function of transmission delay between said central station and a most distant one of said terminal stations, each of said successive integer values is transmitted m times, where m equals $L/2^n$, $2^n$ being the maximum value of said successive integer values.

7. A method according to claim 6, characterized in that said idle time window has an interval that equals two said cells and that said repetitive signals are transmitted at the cell rate.

8. A method according to claim 7, characterized in that said steps are repeated $L/2^n$ times, the length of said repetitive signal being divided by 2 in each repetition, thereby enabling the determination of said signal delay time with an accuracy of one said cell.

9. A method according to claim 2, characterized in that said second predetermined time interval equals L−1 cells, where L equals two times the maximum possible difference in transmission delay between two said terminal stations.

10. An optical network with a plurality of terminal stations (TS1–TSn) connected to a central station (CS) via a tree-like connection structure, and wherein said terminal stations are adapted to send cells containing information signals to said central station in dedicated time slots, said central station including means to receive a predetermined ranging signal from one terminal station (CSi) of said plurality of terminal stations in an idle time window during which no said cells are transmitted, said ranging signal initially having a length or duration equal to two times a maximum possible difference, among respective terminal stations, in respective transmission delays between each terminal station and said central station, and said terminal stations each including means to send said predetermined ranging signal, characterized in that said central station additionally includes:

means to send a start signal (start CR) from said central station to said terminal stations;

means to sends, after a first predetermined time interval after the sending of said start signal, an inhibit signal from said central station to said terminal stations, to indicate to said terminal stations that no said cells are to be transmitted during said idle time window;

means to determine a signal transmission delay time, between said one terminal station and said central station, from the contents of said ranging signal received by said central station from said one terminal station during said idle time window; and wherein said terminal stations each additionally include:

means to receive said start signal from said central station sent to said terminal stations and to send out said predetermined ranging signal, a second predetermined time interval after the receipt of said start signal, said predetermined ranging signal having an amplitude which is smaller than the amplitude of said information signals, thereby avoiding degradation of said information signals due to the transmission of said predetermined ranging signal outside said idle time window.

11. A central station (CS) adapted to be included in an optical network with a plurality of terminal stations (TS1–TSn) connected to said central station via a tree-like connection structure, and wherein said terminal stations are adapted to send cells containing information signals to said central station in dedicated time slots, said central station including means to receive a predetermined ranging signal from one terminal station of said plurality of terminal stations in an idle time window during which no said cells are transmitted, said ranging signal initially having a length or duration equal to two times a maximum possible difference, among respective terminal stations, in respective transmission delays between each terminal station and said central station, characterized in that said central station additionally includes:

means to send a start signal (start CR) from said central station to said one terminal station;

means to send, after a predetermined time interval after the sending of said start signal, an inhibit signal from said central station to said terminal stations, to indicate to said terminal stations that no said cells are to be transmitted during said idle time window;

means to determine a signal delay time, between said one terminal station and said central station, from the contents of said ranging signal received by said central station from said one terminal station during said idle time window.

12. A central station (CS) adapted to be included in an optical network with a plurality of terminal stations (TS1–TSn) connected to said central station via a tree-like connection structure, and wherein said terminal stations are adapted to send cells containing information signals to said central station in dedicated time slots, said central station including means to receive a predetermined ranging signal from one terminal station of said plurality of terminal stations in an idle time window during which no said cells are transmitted, said ranging signal initially having a length or duration equal to two times a maximum possible difference, among respective terminal stations, in respective transmission delays between each terminal station and said central station, characterized in that said central station additionally includes:

means to send a start signal from said central station to said one terminal station;

means to send, after a predetermined time interval after the sending of said start signal, an inhibit signal from said central station to said terminal stations, to indicate to said terminal stations that no said cells are to be transmitted during said idle time window;

error recovery means to interpret error codes included in said cells and to recover said information signals in case of corruption by said information signals due to the transmission of said predetermined ranging signal outside said idle time window;

means to determine a signal transmission delay times between said one terminal station and said central station, from the contents of said ranging signal received by said central station from said one terminal station during said idle time window.

13. A terminal station (TSi) adapted to be included in an optical network with a plurality of terminal stations (TS1–TSn) similar to said terminal station and connected to a central station (CS) via a tree-like connection structure, and wherein said terminal stations are adapted to send cells containing information signals to said central station in dedicated time slots, said terminal station including means to send a predetermined ranging signal to said central station for receipt in an idle time window during which no said cells are transmitted, said ranging signal initially having a length or duration equal to two times a maximum possible difference, among respective terminal stations, in respective transmission delays between each terminal station and said central station, characterized in that said terminal station additionally includes:

means to receive a start signal (start CR) from said central station to said terminal stations and to send out said predetermined ranging signal a predetermined time interval after the receipt of said start signal, said predetermined ranging signal having an amplitude which is smaller than the amplitude of said information signals, thereby avoiding degradation of said information signals due to the transmission of said predetermined ranging signal outside said idle time window.

14. A terminal station (TSi) adapted to be included in an optical network with a plurality of terminal stations (TS1–TSn) similar to said terminal station and connected to a central station (CS) via a tree-like connection structure, and wherein said terminal stations are adapted to send cells containing information signals to said central station in dedicated time slots, said terminal station including means to send a predetermined ranging signal to said central station for receipt in an idle time window during which no said cells are transmitted, said ranging signal initially having a length or duration equal to two times a maximum possible difference, among respective terminal stations, in respective transmission delays between each terminal station and said central station, characterized in that said terminal station additionally includes:

means to receive a start signal (start CR) from said central station sent to said terminal stations and to send out said predetermined ranging signal a predetermined time interval after the receipt of said start signal, said predetermined ranging signal having an amplitude relatively near to the amplitude of said information signals; and means to include error codes in said cells.

15. A method for measuring, in an optical transmission network with a plurality of terminal stations (TS1–TSn) connected to a central station (CS) via a tree-like connection structure, a signal transmission delay time between one terminal station (TSi) of said plurality of terminal stations and said central station, said terminal stations being adapted to send cells containing information signals to said central station in dedicated time slots, said method including the step of sending a predetermined ranging signal from said one terminal station to said central station for receipt in an idle time window during which no cells are transmitted, characterized in that said method additionally includes the steps of:

sending a start signal (start CR) from said central station to said one terminal station (TSi);

after a first predetermined time interval after the receipt of said start signal, sending said predetermined ranging signal from said one terminal station to said central station, said predetermined ranging signal having an amplitude which is smaller than the amplitude of said information signals, thereby avoiding degradation of said information signals due to the transmission of said predetermined ranging signal outside said idle time window;

after a second predetermined time interval after sending said start signal, sending an inhibit signal from said central station to said terminal stations to indicate to said terminal stations that no said cells are to be transmitted during said idle time window;

determining, in said central station, said signal transmission delay time from the contents of said predetermined ranging signal received by said central station during said idle time window; and wherein, in a first application of said steps, where said first predetermined time interval equals zero, the length of said predetermined ranging signal equals L, where L equals two times the maximum possible difference, among respective terminal stations, in respective transmission delays between each terminal station and said central station.

16. A method according to claim 15, characterized in that said first predetermined time interval initially equals a previously determined coarse value of said signal transmission delay time, said steps then being performed to obtain a more accurate value thereof.

17. A method according to claim 15, characterized in that said first predetermined time interval equals zero.

18. A method according to claim 15, characterized in that said predetermined ranging signal is composed of repetitive signals including successive integer values.

* * * * *

UNITED STATES PATENT AND TRADEMARK OFFICE
CERTIFICATE OF CORRECTION

PATENT NO. : 5,808,766
DATED : Sep. 15, 1998
INVENTOR(S) : Van de Voorde et al.

It is certified that error appears in the above-identified patent and that said Letters Patent is hereby corrected as shown below:

1. In column 7, line 51, "sends" should be --send--.

2. In column 8, line 60, "times" should be --time,--.

Signed and Sealed this

Twelfth Day of January, 1999

Attest:

Attesting Officer

*Acting Commissioner of Patents and Trademarks*